United States Patent
LaFleur et al.

[11] Patent Number: 6,093,448
[45] Date of Patent: Jul. 25, 2000

[54] PROCESS FOR GRADIENT REFRACTIVE INDEX OPTICAL OBJECTS

[75] Inventors: Edward Ewart LaFleur, Warminster; Angelo Anthony Lamola, Worcester, both of Pa.

[73] Assignee: Rohm and Haas Company, Philadelphia, Pa.

[21] Appl. No.: 08/978,332

[22] Filed: Nov. 25, 1997

Related U.S. Application Data

[60] Provisional application No. 60/027,929, Oct. 9, 1996.

[51] Int. Cl.[7] .................................................. B05D 5/06
[52] U.S. Cl. ................................. 427/163.2; 427/255.4; 427/393.5; 427/399; 427/508; 427/509; 427/514
[58] Field of Search .......................... 427/508, 163.2, 427/509, 514, 699, 255.4, 393.5

[56] References Cited

U.S. PATENT DOCUMENTS 3,955,015  5/1976  Ohtsuka et al. .
3,999,834  12/1976  Ohtomo et al. .................. 350/96 GN

FOREIGN PATENT DOCUMENTS

| 0 130838 | 1/1985 | European Pat. Off. . |
|---|---|---|
| 8-146234 | 6/1996 | Japan . |
| 8-146235 | 6/1996 | Japan . |

*Primary Examiner*—Janyce Bell
*Attorney, Agent, or Firm*—Wendy A. Choi

[57] ABSTRACT

An improved process, preferably continuous, for the manufacture of gradient refractive index optical objects, wherein a core polymer, which itself may be prepared by a continuous and incorporated process, is passed through a hollow porous surrounding, generally cylindrical so as to obtain and maintain a rounded fiber, through which is fed a second monomer whose polymer has a lower refractive index than the core polymer, so as to swell the core polymer. The swollen polymer with a gradient of swelling by the second monomer from surface to core, is then led to a polymerization unit to complete the polymerization before equilibration of the second monomer throughout the core polymer occurs. The resulting polymers are useful in the preparation of optical fibers and light pipes.

9 Claims, 1 Drawing Sheet

PROCESS FOR GRADIENT REFRACTIVE INDEX OPTICAL OBJECTS

This invention claims the benefit of U.S. provisional application Ser. No. 60/027,929 filed Oct. 9, 1996.

This invention relates to an improved process for forming clear fibers, light pipes, and rods which exhibit a gradient refractive index behavior from the outside to the center of the object, for use in light transmission.

Plastic optical fibers, wherein a clear polymeric material, often called a "core," is surrounded with a clad of material of lower refractive index and through which light is conducted, have become very important in recent years in the conducting of light for illumination purposes, and for the carrying of optical signals for communication. The materials of commerce are polymers of uniform composition, that is, the composition and refractive index are similar throughout the length and breadth of the fiber. When clad with a sheath of a polymer of lower refractive index, they are referred to as "step-index" polymers.

Means have been sought to vary the refractive index of the polymeric material for several end purposes. By varying the refractive index uniformly from the surface of the core to a higher value near or at the center of the core, it can be calculated and confirmed experimentally that there is less reflection at the surface of the fiber, with subsequent less loss of light due to reflection. This is similarly true for thicker fibers, known as light pipes, and for other optical uses for clear plastics. Further, the light at the exit of the pipe has less temporal signal dispersion or lagging of the phase velocity, and therefore is more effective both in illumination or for carrying signals, such as digital information, at very high data transmission rates. Thus, a short duration signal pulse from a light-emitting diode or laser diode does not become significantly broadened in duration during transmission through the optical fiber.

Several methods have been proposed for the preparation of such materials, such as forming a hollow pipe of a first polymer, filling it with a second monomer (or mixture of monomers) whose polymer will have a higher refractive index than that of the first polymer, and then slowly polymerizing the second monomer while or after it has sorbed into the first polymer. Another method is to produce a rod or core of a first polymer of higher refractive index and then allow it to be swollen by a second monomer whose polymer is of lower refractive index, simultaneously or belatedly polymerizing the second monomer.

Typical of the latter process is Ohtomo et al., U.S. Pat. No. 3,999,834, who describe a core/sheath circular optical fiber with a sheath through which a second monomer may be sorbed to convert the internal core to a gradient refractive index fiber. Ohtomo requires the separate and preliminary formation of a core/sheath material, which further requires his sheath be thermoprocessable and allow transport of the second monomer without dissolution, requiring very specific demands on its solubility and swelling in the second monomer. Further, the ultimate product either must utilize the sheath and its inherent optical properties. Further, the process of Ohtomo is limited by the fact that the new monomer must sorb and desorb through the non-porous sheath he utilizes.

If the sheath is absent, as in Ohtsuka et al., U.S. Pat. No. 3,955,015, that process requires separately imparting a form to the core polymer prior to monomer swelling, requires having a partially crosslinked core polymer which makes the polymer unattractive to shape and to use in a continuous process, is a more expensive batch process, and leads to less control over the final shape of the polymer after polymerization of the second monomer. Ohtsuka further teaches that an uncrosslinked core polymer is unsatisfactory because the core swollen with the second monomer becomes hazy.

Two Kokai from KH Kogyo Gijutsu Kenkyhin (08-146, 234-5) disclose flowing two different polymer/monomer solutions through an orifice to obtain a composite monofilament, "passing through the composite monofilament through a diffusion device" to allow the first and second monomers to cross the interface, and hardening the resultant mixture of monomers and polymers to form a continuous refractive index profile. The process therein described requires processing of two separate monomer/polymer syrups and forming an appropriate interface, which is technically much more difficult than controlling the diffusion of a single monomer into a pre-form polymer core. It further requires establishing an appropriate interface and "diffusion device" rather than separating the diffusion device from the interface of only one polymer with a second monomer. For these reasons, these Kokai do not offer the ease of processing and control of diffusion and polymerization conditions to greatly improve the process over the earlier art.

Thus, an improved method for forming such gradient refractive index fibers, filaments, rods, flexible or rigid light pipes, or other transparent polymers is sought to overcome the lack of uniformity, the inability to use a linear core polymer, and the batch operation or complicated semi-continuous operation of the processes known to the art. We have discovered a process which allows a continuous operation for the polymerization of the core monomer (if such is desired), combined with a continuous, predictable and consistent process for the preparation of the gradient refractive index fiber by polymerization of a second monomer of lower refractive index in the presence of the core polymer. It may be described as: a method for forming a gradient refractive index polymer fiber comprising:

(a) disposing a polymer core along the interior of a porous tube or porous surrounding;

(b) contacting the polymer core with a second monomer by allowing the second monomer to traverse the tube, such that a portion of the second monomer diffuses into the polymer core;

(c) initiating polymerization of the second monomer at a time while there remains a concentration gradient of the second monomer in the polymer core, the refractive index of the disposed polymer core differing from the refractive index of the polymer formed from the second monomer mix.

Specifically, we have discovered in the method for producing optical fibers (the term "fiber" including fibers, filaments, flexible or rigid light pipe in the range of 1 mm. to 20 mm. diameter, rods, and the like) having a variation of refractive index in the cross-sectional direction of the fibers, which method comprises:

(a) contacting a core polymer formed from one or more first monomers, which "first monomer" may be a mixture of monomers, plus initiators, chain transfer agents, additives, etc., and containing from 0 to 50 weight percent of unreacted first monomer (and concurrently, 50 to 100 weight percent of a homopolymer or copolymer formed from the one or more first monomers), with a second monomer, which may be a mixture of monomers, plus initiators, chain transfer agents, additives, etc., whose corresponding polymer exhibits a refractive index of at least 0.01 lower than the refractive index of the core polymer;

(b) allowing diffusion of the second monomer into the core polymer;

(c) prior to uniform distribution by diffusion of the second monomer throughout the core polymer, initiating polymerization of the second monomer and any unreacted first monomer, that is, monomer remaining from the formation of the core polymer, whereby to transform the core so that the refractive index of the transformed core decreases in a gradient manner from the center of the core to the periphery of the core and the difference between the refractive index at the center of the core and the refractive index at the periphery of the core is at least 0.005; the improvement which comprises (d) causing the core polymer to flow in a continuous mode through the interior of a porous surrounding;

(e) diffusing the second monomer from the exterior of the porous surrounding through the porous surrounding so as to distribute evenly the second monomer to the surface of the core polymer;

(f) simultaneously or sequentially adjusting the time of contact with the diffused second monomer of the core polymer and the temperature of the diffusion zone so as to sorb the desired amount of the second monomer to the core polymer;

(g) initiating polymerization of the second monomer and any unreacted first monomer upon exiting or removal of the core polymer containing the sorbed second monomer from the porous surrounding.

In our invention, the porous surrounding is preferably cylindrical in nature, although other shapes may be utilized if the final object is to be non-cylindrical. It is further preferably a coaxial tube. The porous surrounding serves several purposes: it maintains the shape of the core polymer, since the swollen core polymer cannot pass beyond the confines of the porous surrounding. It further distributes the second monomer in an uniform manner. The porous surrounding is essentially a porous or perforated sheath or shell which is present at the time of swelling with the second monomer, but is not present when the polymerization of the second monomer is accomplished nor when the final article with a gradient refractive index is ready for use.

The porous surrounding is preferably ceramic, although it may be a metal with pre-formed pores, a plastic (thermoplastic or thermoset) which has pre-formed pores and which itself is not distorted by swelling with the second monomer, or it may be a crosslinked or crystalline polymer with appropriate rapid diffusion properties. It may be described as a membrane. The diffusion rate of the second monomer or the penetration rate through the porous structure must be sufficient to carry the second monomer to the core polymer and allow the second monomer which has passed through the porous structure to be taken up by the core polymer during its contact time with the second monomer. If a plastic porous surrounding is utilized, it must allow free passage of the core polymer swollen with the second monomer so that it can exit readily from the porous surrounding. For these reasons, a porous material with very rapid transport from exterior to interior is highly preferred, and especially preferred is that the porous structure be a material containing pores, that is, with discrete holes or measurable size, and further preferable that it not be swollen with the second monomer. It is separately preferable that the porous surrounding be a coaxial tube.

Under certain conditions, a porous glass surrounding made of glass or other material transparent to ultraviolet light may be utilized. The partially swollen, non-equilibrated core may be irradiated before or during exiting or removal of the core from the zone where the diffusion occurs, and the polymerization commenced at that time.

In our improved process, the polymerization of the core polymer and the diffusion and polymerization of the second monomer may be continuous processes, such as production of the core polymer in a continuous reactor, such as continuous flow stirred tank reactor, the polymer so formed being conducted continuously through the porous surrounding while the second monomer is continuously passed through the porous structure and taken up by the core polymer, then polymerized after issuing from the porous structure. The "second monomer" is defined as one or more second monomers whose resulting polymer or copolymer differs in refractive index from that of the core polymer, optionally with a plasticizer, and optionally but preferably with an initiator of polymerization. The polymerization of the second monomer to form the second polymer preferably is conducted continuously also, or it may be conducted at a later time or in a batch mode. If too much time is allowed, the second monomer will sorb throughout the core polymer and all portions of the final object will have the same refractive index, so it is highly preferred to conduct the polymerization of the second monomer well before equilibration occurs.

It is also possible to conduct the reaction in an extruder, further combining devolatilization to the desired extent, and then convey the melt through an appropriate die to the porous surrounding.

The core polymer may be lightly crosslinked prior to conveyance to the porous surrounding, although the core polymer must have either sufficient melt flow to be conveyed through the apparatus, or sufficient physical integrity to be conveyed in solid form. In the latter case, diffusion of the second monomer to achieve the parabolic distribution in an acceptable time period may be more difficult to accomplish.

A preferred method of conducting the polymerization of the second monomer well before equilibration occurs is to add an additional initiator of polymerization to the second monomer prior to or during the diffusion of the second monomer, preferably a photoinitiator. The polymerization of the second monomer and any unreacted first monomer upon exiting or removal of the core polymer containing the sorbed second monomer from the porous surrounding is subsequently initiated by exposure to ultraviolet light. The second polymerization may be carried out by thermal methods, but it is preferred to use a method where the core polymer/second monomer mixture is polymerized at a lower temperature to slow further diffusion of the second monomer and maintain the gradient structure desired. Use of a photoinitiator allows delay of triggering the polymerization of the second monomer until the composite has been removed from the porous surrounding. Early initiation of polymerization of the core polymer/second monomer composite leads to a more viscous mixture which is harder to transfer continuously. (We shall use the term "polymer/monomer composite" to describe the core polymer containing the sorbed, non-yet polymerized second monomer, and the term "composite polymer" to describe the core polymer containing the polymerized second monomer.)

It is alternatively possible to add the photoinitiator for the second monomer to the core polymer during its formation or conveyance to the porous surrounding. It is also possible, especially if the core polymer is designed to be flexible, such as when it is based on a polyacrylate, to have the core polymer contain appropriate functionality for post-crosslinking the core polymer to give more integrity to the resulting flexible structure. Such crosslinking may be accomplished by many means known to the art, but preferred is the presence of a functionalized monomer copolymerized into the core polymer in combination with a reactive agent, and optionally a catalyst for the reaction between the reactive agent and the functionalized monomer to crosslink the core. Such reactions can include the reaction of a pendant trialkoxysiloxane group with water catalyzed by an organotin catalyst, the reaction of pendant hydroxyl groups, such as from copolymerization of an hydroxyalkyl acrylate monomer, with a diisocyanate, and the like.

The concept, although generally described herein for core polymer and second monomers polymerized by free-radical reactions, may be applied to core polymers which are "non-vinyl" in nature, such as polycarbonates, silicone-based polymers and the like. The second monomer also need not be a vinyl monomer, but may be capable of being polymerized by a non-radical process after exiting or removal from the porous surrounding, such as an epoxy-containing material, such as mixture of mono- and difunctional glycidyl ethers. A silicon-based monomer or diffusible oligomer which can be further polymerized by, e.g., admixture with water and then heating, could also be suitable in this regard. The word "monomer" is not restricted to materials with double bonds, but also includes those materials with functionality capable of non-radical addition polymerization.

It is most desirable to avoid any polymerization of the second monomers during the contact with the porous surrounding, as recirculation of the unpolymerized unabsorbed monomer is desired in a continuous process. Recirculation would be hampered by the presence of polymer in the monomer because of viscosity and heat build-up concerns. Further, if no polymer is formed, removal and cleaning of the porous surrounding is less of a problem. However, for static processes, or systems where the viscosity of the remaining mixture is not a problem, initiation may occur prior to exiting or removal of the swollen core from the porous surrounding.

The present system may be utilized for more than one contact with a second monomer, further to vary the distribution pattern of the second monomer prior to polymerization, or a third monomer, further differing in refractive index of the formed polymer, may be introduced through a separate porous surrounding.

One advantage to having the core polymer with a low residual monomer content prior to introducing it into the porous surrounding is that there is less need for calculating exact diffusion conditions which will allow for mingling of core polymer residual monomer with the second monomer to assure the preferred gradient structure. Further, the effect on refractive index can be predicted more readily when concern need not be taken for residual core monomer. Further, low residual monomer content of the core polymer allows it to be prepared and handled separately, then re-converted into a molten form without any safety concerns about residual monomer.

When the process is continuous, then it is acceptable to carry over some residual core monomer, as long as the core polymer is not so plasticized by the residual monomer that it cannot be conducted into the porous surrounding. Thus, it is preferred that the residual monomer content of the first monomer is 0 to 15 weight percent prior to introduction of the core polymer into the interior of the porous surrounding. The preferred residual monomer value may be attained by a devolatilization process prior to introduction of the core polymer into the interior of the porous surrounding, or it may be achieved directly by control of the core polymerization conditions. It should be noted that an upper limit for ready removal of the core polymer from the continuous flow stirred tank reactor (CFSTR) in a readily handled, pumpable, fluid state is ca. 85% conversion, dependent of course upon the glass temperature of the core polymer and its molecular weight.

If desired, a plasticizer may be present in the second monomer, the plasticizer being at least compatible with the core polymer and the second polymerized monomer mix, the plasticizer being of lower refractive index than the core polymer. The plasticizer may aid diffusion of the second monomer into the core polymer and may be a less expensive way of lowering the refractive index than use of an expensive monomer. Its disadvantage is that the resulting polymer blend will be plasticized and thus less rigid and softening at a lower temperature, which may make the blend less acceptable for applications where rigidity and/or higher softening temperatures are desirable.

After the completion of our inventive process by removing the core polymer swollen in a graduated manner (that is, to yield a predetermined refractive index distribution in the core polymer) with the second monomer, which preferably contains an initiator of polymerization, from the porous surrounding, the removed polymer/monomer composite is preferably presented to a means for initiating or continuing the polymerization of the second monomer, preferably at a rate rapid enough to prevent further diffusion of the second monomer. This means may be a source of radiation, such as gamma or beta radiation, but preferably light, such as visible or, more preferably, ultraviolet light. Another means is to pass the polymer/monomer composite into or through an oven at a temperature sufficient to initiate the polymerization. Both ultraviolet light and heat may be used, preferably sequentially.

It is also possible to conduct a pre-clad polymer core through the porous surrounding, the pre-cladding being a fluorocarbon polymer with certain solubility restrictions:

(a) of lower refractive index than the polymer from the second monomer, (b) being soluble in the second monomer, (c) capable of admixture at the molecular level (miscible) with both the first (core) and second polymers.

With thin cladding, the cladding might fully dissolve and be sorbed. With a thicker cladding, diffusion conditions could be controlled to dissolve enough of the cladding in the second monomer to lower further the refractive index of the second polymer system formed and make the resulting gradient refractive index structure more effective by a higher differentiation between the refractive indices of the core and second polymer, whilst preferably still maintaining enough integrity to allow the cured system to be jacketed and utilized directly. (At a minimum, it would be preferable that the clad should have enough integrity to contain the final construct through the exit from the porous surrounding and through the polymerization of the second monomer, until further cladding could optionally be applied). As an example, terpolymers of vinylidene fluoride/ tetrafluoroethylene/hexafluoropropylene (known as THV) might be acceptable.

The now-polymerized composite may be used as formed, may be further altered in appearance by [milling, molding, or extrusion] shaping or cold-compression techniques which do not alter the gradient distribution pattern, or may be drawn into a thinner fiber by conventional drawing means. Concurrently or sequentially, the composite polymer may be inserted into a reflective cladding of lower refractive index and/or a protective sheathing such as polyethylene.

When clad with a reflective cladding of lower refractive index, the fiber or pipe (depending on the final dimensions) may be useful in carrying light from a remote source, optionally through an unfriendly atmosphere for direct lighting, such as water, to an outlet designed for illumination. It may further be useful for effectively conducting narrow-band or, preferably broad-band width signals, such as optical data transmission to an appropriate receiver with less loss of signal power and with reduced signal broadening for higher information content per unit time.

The process herein described can further be used to add a dye material to the core polymer in a manner which will diffuse the dye material in a parabolic manner throughout the core. The dye, such as Rhodamine 6B or Rhodamine 3, with a reasonable quantum yield of fluorescence, can be dissolved in the second manner and carried into the core polymer. It is preferred the dye not inhibit polymerization of the second monomer. If the dye should have a higher refractive index than the core polymer, it can be compensated for by the presence of the second monomer and its resulting polymer of lower refractive index. A major utilization of such dye-diffused gradient cores or fibers will be for light amplification in the visible region, as described by Tagaya et al., Seni-Gakkai Symposium Preprints, page B-1, 1992.

The resulting gradient refractive index pipe or fiber may also be useful in non-pipe or fiber applications An appropriate cross-, angled-, or longitudinal section of the final polymerized GRIN-modified core may be useful as a lens, such as a contact or magnifier lens, or for optical film applications, where the improved optics add value to the product.

The core polymer may be any of those thermoplastics which are clear, preferably amorphous, at the use temperature, stable to light, and have been used for light conducting operations. Preferred are those based on esters of (meth)acrylic acid, such as methyl methacrylate, ethyl acrylate, butyl methacrylate, butyl acrylate, and the like. Copolymers with monomers bearing aryl substituents can be useful in raising the refractive index, so such comonomers as styrene, vinylidene chloride, benzyl methacrylate, and the like may be employed. A chain transfer agent is preferably present to control the molecular weight so that flow of the molten core polymer is enhanced. Other polymers which may be employed are polymers and copolymers of vinyl aromatics, such as vinyl naphthalene, styrene, chlorostyrene, and the like; polycarbonates, such as bisphenol A polycarbonate; polysiloxanes; and the like.

The choice of the second monomer is somewhat predicated by the nature of the core polymer. The polymer from the second monomer must be compatible, and preferably miscible, with the core polymer, and of lower refractive index by at least 0.01 units, preferably at least 0.03 units. Such monomers may be alkyl acrylates, which have lower refractive indices than the corresponding methacrylates. They may also be fluorinated monomers, such as 2,2,2-trifluoroethyl methacrylate, trihydroperfluoropropyl methacrylate, 1,1,5-trihydroperfluoropentyl acrylate or methacrylate, and the like. If the refractive index of the core polymer is high, such as if it is a polymer of styrene, then a second monomer of higher refractive index than an acrylate or a fluorinated (meth)acrylate, such as methyl methacrylate, can be used, although the resulting polymer must still be of lower refractive index than the core polymer.

To improve the selection of reaction conditions and components, certain parameters can be pre-determined and/or found in the literature. The refractive index of many polymers is readily available, can be estimated for copolymers, or if necessary, determined experimentally. There are data on many blends of polymers as to whether they are miscible (that is, separation of components can only be observed on a molecular level below the scattering of light) or compatible (blend mechanical properties not adversely affected, but mixture is not necessarily optically clear). Again, the behavior of mixtures can be experimentally determined, fairly readily as far as optical properties are concerned.

There is only a limited amount of available data for the rates of diffusion of monomers into a pre-formed core polymer, especially at various temperatures, and less available for the diffusion into core polymer plasticized by residual monomer. The diffusion rate through the porous surrounding is quite fast relative to diffusion into the polymer. A complicated, but computer-programmable, program can be used to determine the concentration profile of the second monomer; when polymerized without further diffusion, the highly desirable parabolic refractive index distribution will be obtained. Related calculations can be based on the equations of the Ohtsuka reference. For the calculation, a knowledge of the ratio of the diffusion coefficient of the porous surrounding to that of the polymer melt is required.

The ultimate polymer composite need not necessarily be thermoplastic, if the polymer composite after polymerization of the second monomers is in a form suitable for end use, such as a flexible crosslinked light pipe which needs only cladding and sheathing. In that case, a crosslinking monomer, such as a polyunsaturated monomer may be present in the second monomer. In most instances, however, where the composite polymer is to be further thermoprocessed, such as by fiber elongation, crosslinking is less desirable.

EXAMPLE 1

General Description of the Process

Figure 1:
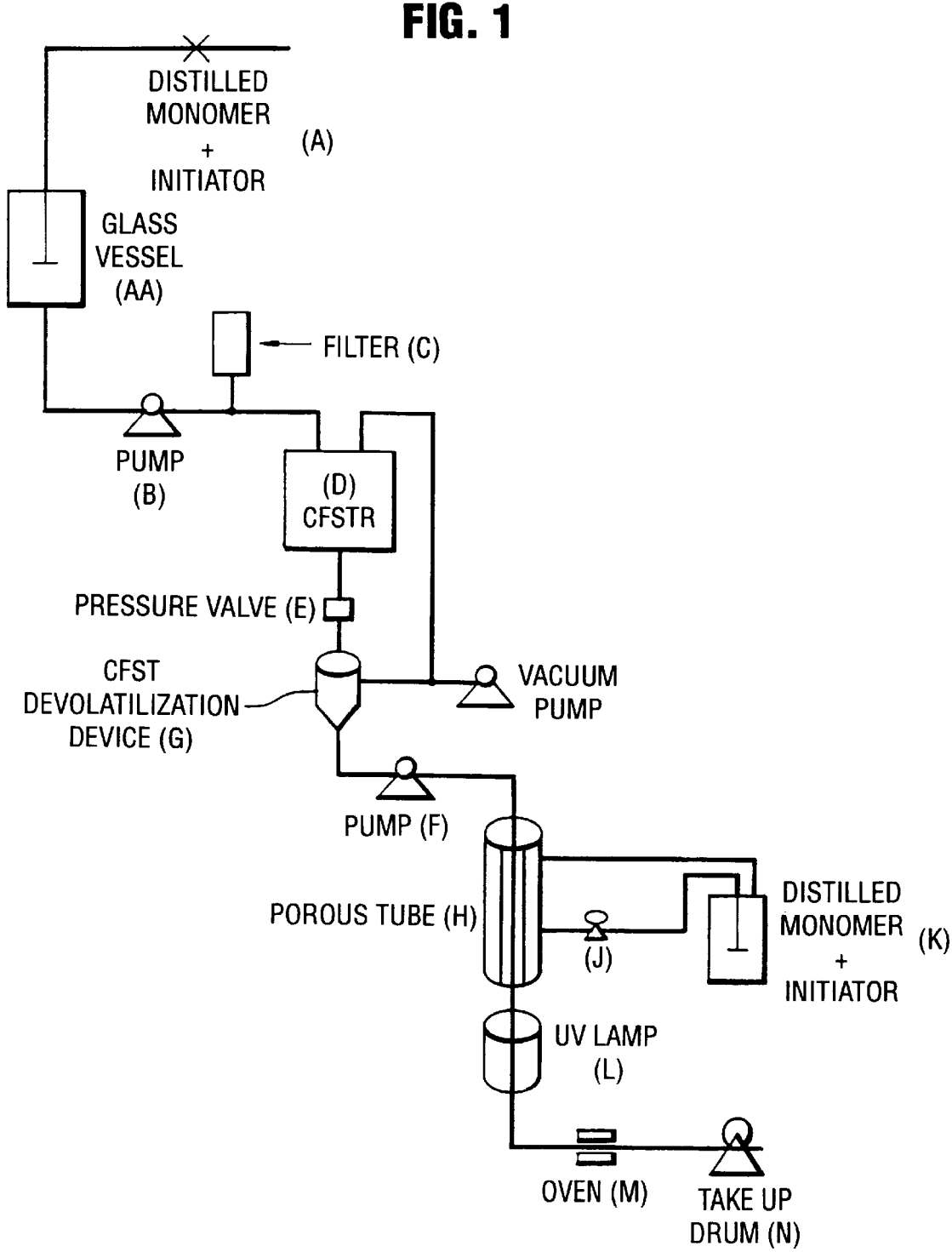
FIG. 1 illustrates an apparatus for carrying out a method of the invention.

The process in one of its possible embodiments is illustrated in FIG. I, and the various points in the process are labelled by letters and identified in the following text.

The core copolymer is prepared by the use of a continuous flow stirred tank reactor (CFSTR). The monomer mixture (A) is prepared from the two monomers and other essential ingredients, such as azo or other initiator and alkyl mercaptan chain transfer agent. This filtered mixture is fed into a glass vessel in which the mixture is purged with an inert gas such as argon. After purging, the monomer mixture is degassed and kept under an argon blanket. The mixture is then pumped (B) at a maximum rate of 15 g/min. through a series of filters (C) into the CFSTR (stainless steel construction, capacity 450 ml.) (D) in which the monomers are copolymerized to yield ca. 15 to 85 weight percent conversion. The polymerization is generally accomplished at temperatures ranging from 105 to 125° C., in this series at 122–125° C. At this temperature range, the operating pressure and stirring rate is set (E) at 120 psi (827 kPa) and 300 RPM respectively. Since the polymerization reaction is highly exothermic, the reactor temperature is controlled with the aid of a cooling jacket. The polymerization is performed in the absence of a solvent.

The polymer so formed at ca. 85% conversion is conveyed through a pipe and a Grove valve where it is discharged into a glass jar under an argon atmosphere. The Grove valve is so equipped that optionally the core polymer could have been directly conveyed to the porous surrounding, or to a CFST (constant-flow stirred tank) for further devolatilization.

The core polymer is on the following day heated to a temperature of ca. 125–150° C., and conveyed through a valve and die to conform to a size suitable for introducing to the porous surrounding.

Although not employed in Examples 2 and 3, it has been found that a gear pump (F) may be placed in series between (a) the exit of the CFSTR or the CFST devolatilization device (G), if one is employed to remove residual monomer from the core polymer, or the melt container, if one is employed to re-heat the cooled core polymer and (b) the inlet to the porous surrounding. Its use gives a more uniform flow of the core polymer before, during, and after the diffusion and sorption operation.

The porous surrounding (H) is prepared from high-purity inert alumina and is a cylinder 216 mm. long, 7.4 mm. inner diameter, and 15 mm. outer diameter. The pore size utilized in the experiments is 3.0 microns, but a range of pore sizes may be utilized. The porous surrounding is within a larger cylindrical container, 125 mm. long, maintained vertically, of inner diameter ca. 19 mm., capped with an inlet and outlet leading directly to the porous surrounding. Both glass and stainless steel cylinders have been utilized. At the bottom and top of the cylinder are inlet ports of 6.35 mm. inner diameter, which connect directly to the porous surrounding. It is important to avoid any point where the molten core polymer can "hang-up" as it passes into or out of the outer coaxial cylinder.

Two feeds of ca. 6.35 mm. for inlet and outlet of the second monomer (K) are present on the sides of the cylinder, about 63.5 mm. apart. The second monomer is fed by gravity, although a pump (J) could be used, into the area between the cylinder and the porous surrounding. The apparatus containing the porous surrounding is maintained at ambient temperature, the core polymer fed through at a rate of 3.6 g./minute, and the second monomer fed at a rate to keep the unit full. The flow rate of the core polymer and the temperature of the cylindrical container are controlled so that the monomer absorbed by the core polymer forms a parabolic concentration gradient with respect to the central axis of the core.

The swollen core polymer, containing from 1 to 30 weight percent of the second monomer, is then led at ambient temperature past an enclosed annular ultraviolet light source (L) (Blak-Ray long wave UV lamp, Model B 100AP, with an enclosure box of mirrors placed ca. 125 mm. from the swollen core polymer) at a rate of 4 to 10 mm./minute, the full light intensity being 7000 microwatts/ cm$^2$ at a wave length of 365 nm. and a distance of 25.4 mm. It is then led into a nitrogen-filled oven (M) held at 75° C. to complete the polymerization. If flexible, the polymer may be wound up in a take-off drum (N).

EXAMPLE 2

The core polymer is formed from a copolymer of methyl methacrylate/benzyl methacrylate (80/20 by weight). The second monomer is ethyl acrylate. The residence time in the reactor is between 1 and 2 minutes. Although the reaction proceeded smoothly, the resulting polymer could not be demonstrated to have the gradient structure because Fourier transform infra-red analysis (FTIR) centering on the band arising from C-H stretch could not cleanly distinguish between ethyl acrylate and methyl methacrylate units.

A monomer concentration profile is generated from measurements of weight uptake of EA monomer. The measurements are carried out for both the porous ceramic tube and a 87.2% converted, P(MMA-co-Benzyl methacrylate=80/20), copolymer gel. As expected, the porous tube becomes saturated almost instantaneously with the EA monomer. From the sorption data for the copolymer gel, a diffusion coefficient of magnitude $46 \times 10^{-4}$ cm$^2$/s is calculated. When this diffusion coefficient is used in the theoretical expression for monomer diffusion into a coaxial cylinder, it is calculated that a maximum of 10 seconds is sufficient for the development of a parabolic concentration profile for the EA monomer-P(MMA-co-Benzyl methacrylate=80/20) system.

EXAMPLE 3

When butyl acrylate is employed instead of ethyl acrylate under the conditions of Example 2, an optical clear composite polymer is obtained. (It is noted that prior to the polymerization of the butyl acrylate, the swollen core polymer becomes hazy).

The core polymer is formed from a copolymer of methyl methacrylate/benzyl methacrylate (80/20 by weight). To the CFSTR is fed a nitrogen-sparged, filtered mixture of 2400 parts methyl methacrylate, 600 parts of benzyl methacrylate, 1.5 parts of 1,1'-azobis(cyclohexanecarbonitrile) initiator, and 1 part of n-dodecyl mercaptan. The polymerization is conducted at 125° C. at a residence time of 30 minutes. The polymer is at 56.2% conversion and is eluted from a Grove valve at 100° C. and a pressure of 110 psi (758 kPa).

The eluted polymer is then conducted at a flow rate of 15 grams/minute at a temperature of 125° C. into the porous surrounding, where it is contacted with a second monomer feed of butyl acrylate (600 parts), benzoyl peroxide 3.55 parts, benzoin 2.5 parts and 15 parts of n-dodecyl mercaptan that has passed through the porous surrounding. The swollen core polymer/second monomer mixture exiting the porous surrounding was at 56.1% conversion. The exudate is then irradiated by the UV lamp, collected in a 6 foot (1.52 meter) Teflon tube, and stored overnight. The conversion of the final composite polymer showed less than 20 ppm of residual butyl acrylate, although there was 8.7% residual methyl methacrylate determined. The final composite polymer had a weight-average molecular weight ($M_w$), based on a poly(methyl methacrylate) standard of 56,000, and a glass temperature by TGA of 49° C., whereas the core polymer (with its residual monomer affecting the glass temperature ($T_g$)) had a $M_w$ of 49,000 and a $T_g$ of 22° C.

Refractive Indices for Polymers of Example 3

| Polymer | Homopolymer Value | Copolymer Value (averaged) | Difference between core polymer and polymer from second monomer |
|---|---|---|---|
| PMMA | 1.489 | | |
| PBzMA | 1.568 | | |
| P(MMA/PBzMA) = 4/1 | | 1.505 | |
| P(BA) | 1.463 | | 0.042 |

The periphery of the cylindrical polymer composite when analyzed by FTIR showed evidence of the —CH stretch for poly(butyl acrylate), but this characteristic stretching frequency is absent in samples from the central axis of the cylindrical composite polymer. Optical interferometric evaluation of a disc (1 mm. thick) cut from the cylindrical polymer composite confirmed the refractive index gradient predicted for a parabolic absorption of the second monomer prior to polymerization.

We claim:

1. In the method for producing optical fibers having a variation of refractive index in the cross-sectional direction of the fibers, which method comprises (a) contacting a core polymer formed from a first monomer, and containing from 0 to 50 weight percent of unreacted first monomer, with a second monomer whose corresponding polymer exhibits a refractive index of at least 0.01 lower than the refractive index of the core polymer;

(b) allowing diffusion of the second monomer into the core polymer;

(c) prior to uniform distribution by diffusion of the second monomer throughout the core polymer, initiating polymerization of the second monomer and any unreacted first monomer whereby to transform the core so that the refractive index of the transformed core decreases in a gradient manner from the center of the core to the periphery of the core and the difference between the refractive index at the center of the core and the refractive index at the periphery of the core is at least 0.005; the improvement which comprises:

(d) placing the core polymer in close proximity to the interior of a porous surrounding;

(e) diffusing the second monomer from the exterior of the porous surrounding through the porous surrounding so as to distribute evenly the second monomer to the surface of the core polymer;

(f) adjusting the time of contact with the diffused second monomer of the core polymer and the temperature of the diffusion zone so as to sorb the desired amount of the second monomer to the core polymer;

(g) initiating polymerization of the second monomer and any unreacted first monomer prior to uniform distribution by diffusion of the second monomer throughout the core polymer.

2. In the method for producing optical fibers having a variation of refractive index in the cross-sectional direction of the fibers, which method comprises (a) contacting a core polymer formed from a first monomer, and containing from 0 to 50 weight percent of unreacted first monomer, with a second monomer whose corresponding polymer exhibits a refractive index of at least 0.01 lower than the refractive index of the core polymer;

(b) allowing diffusion of the second monomer into the core polymer;

(c) prior to uniform distribution by diffusion of the second monomer throughout the core polymer, initiating polymerization of the second monomer and any unreacted first monomer whereby to transform the core so that the refractive index of the transformed core decreases in a gradient manner from the center of the core to the periphery of the core and the difference between the refractive index at the center of the core and the refractive index at the periphery of the core is at least 0.005; the improvement which comprises:

(d) causing the core polymer to flow in a continuous mode through the interior of a porous surrounding;

(e) diffusing the second monomer from the exterior of the porous surrounding through the porous surrounding so as to distribute evenly the second monomer to the surface of the core polymer;

(f) simultaneously or sequentially adjusting the time of contact with the diffused second monomer of the core polymer and the temperature of the diffusion zone so as to sorb the desired amount of the second monomer to the core polymer;

(g) initiating polymerization of the second monomer and any unreacted first monomer upon exiting or removal of the core polymer containing the sorbed second monomer from the porous surrounding.

3. The method of claims 1 or 2 wherein the porous surrounding is ceramic or glass.

4. The method of claims 1 or 2 wherein further an additional initiator of polymerization is added to the second monomer prior to or during the diffusion of the second monomer.

5. The method of claim 4 wherein the additional initiator is a photoinitiator, and where the polymerization of the second monomer and any unreacted first monomer upon exiting or removal of the core polymer containing the sorbed second monomer from the porous surrounding is initiated by exposure to ultraviolet light.

6. The method of claim 2 in which the polymerization of the core polymer and the diffusion and polymerization of the second monomer are continuous processes.

7. The method of claims 1 or 2 in which the residual monomer content of the first monomer is 0 to 15 weight percent prior to introduction of the core polymer into the interior of the porous surrounding.

8. The method of claim 7 in which the residual monomer content of the first monomer is decreased to 0 to 15 weight percent by a devolatilization process prior to introduction of the core polymer into the interior of the porous surrounding.

9. The method of claims 1 or 2 wherein a plasticizer is present in the second monomer, the plasticizer being compatible with the core polymer and the second polymerized monomer mix, the plasticizer being of lower refractive index than the core polymer.

* * * * *